E. F. WHITE.
ANTISKID CHAIN.
APPLICATION FILED MAY 24, 1920.
Patented Nov. 23, 1920.
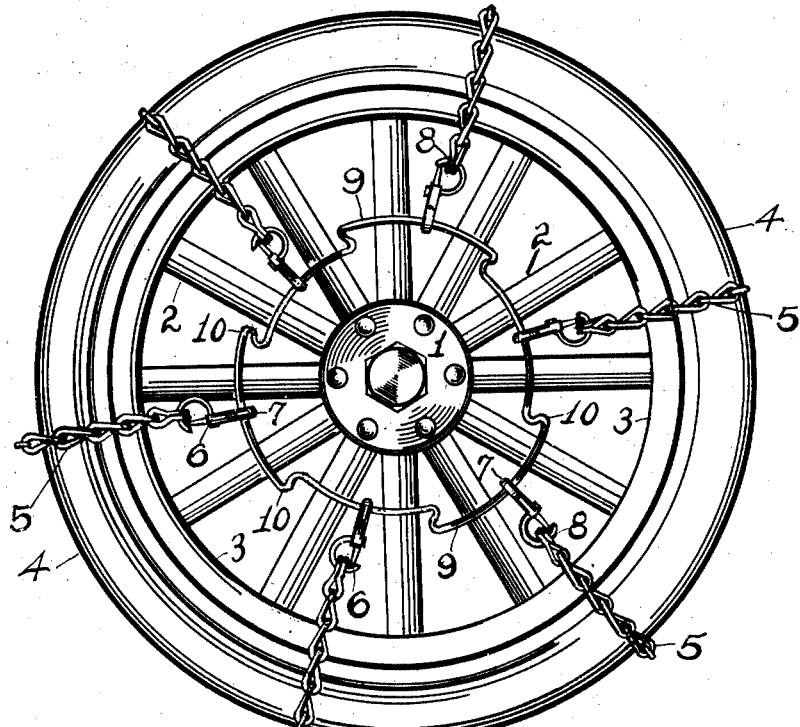
Fig 1
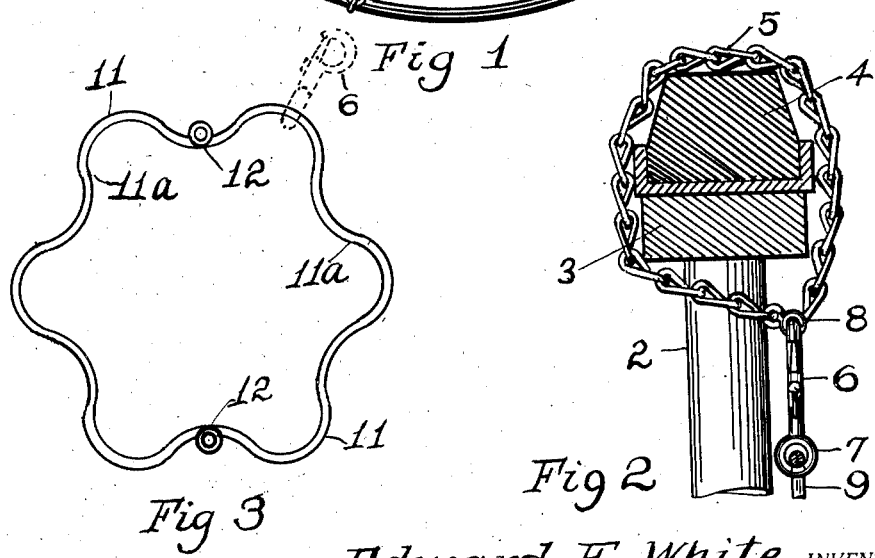
Fig 3
Fig 2
WITNESS:
Edward F. White, INVENTOR.
BY
ATTORNEY.

UNITED STATES PATENT OFFICE.

EDWARD F. WHITE, OF NORFOLK, VIRGINIA.

ANTISKID-CHAIN.

1,360,068.  Specification of Letters Patent.  Patented Nov. 23, 1920.

Application filed May 24, 1920. Serial No. 383,791.

*To all whom it may concern:*

Be it known that I, EDWARD F. WHITE, a citizen of the United States, residing at Norfolk, in the county of Norfolk and State of Virginia, have invented certain new and useful Improvements in Antiskid-Chains, of which the following is a specification.

My invention relates to anti-skid chains for automobile tires.

The object of the invention is to provide means for attaching anti-skid chains to the tires of automobile and auto truck tires which will be moderate in cost, efficient and durable.

Further objects and advantages will be more fully described herein and specifically pointed out in the annexed claims recourse being had to the accompanying drawing forming a part of this specification in which:

Figure 1 is an elevation of a wheel of an automobile or truck with my device in position.

Fig. 2 is a cross section of the rim and tire and an elevation of a part of one of the spokes of the wheel, and Fig. 3 is an elevation of a modified form of a suspended ring which encircles the hub of the wheel.

In the drawing like reference numerals indicate similar parts in all the several views.

1, Fig. 1, is the wheel hub and 2 are the spokes connecting the same to the rim 3.

Upon the rim is placed the tire 4 around the circumference in the customary manner. 5 are the anti-skid chains radially disposed and wrapped once around the diameter of the tire the two end links of which are joined together at one point and held by the hooked member of the snap or spring closed hooks 6 at the point 8.

The snap hooks are provided with an eye or ring end 7 which is formed over and loosely mounted on the ring 9 which is yieldably suspended over the hub by the chains 5 and encircles the same but not touching it or the spokes 2.

The eyes of the hooks 6 are usually placed in the middle of each extension and depression of the ring 9 as shown in Fig. 1 and will now be explained.

The ring 9, as will be seen, consists of two diameters which are formed by the S shaped bends produced therein and may be termed elongated peripheral extensions or alternate depressions and extensions, the bends 10 of which, form independent inherent springs. The durability of this form of ring is more effective than a true circular ring which has not the property of taking care of an unequal strain as the ring shown in Fig. 1.

In Fig. 3, I show a modified form of ring 11 which has a corrugated periphery and also has inherent spring portions shown at 11ª.

The rings 9 and 11 may be made in one piece by welding or made into two parts and the ends joined together by suitable bolts passing through the eyes 12 formed at the ends of the half diameters. In my invention I provide greater resiliency without the use of many sets of spiral springs which become disarranged easily and are costly, besides they are liable to become unduly extended and injured by severe strains, they consequently fail, whereas in my design, the springs are an integral part of the ring itself and any strain in one place will be compensated for by the spring elements. As the diameters of the rings 9 and 11 are very large compared with the diameter of wire of which small springs are made they are better adapted to resist rupture or distortion.

I claim:

1. A device of the class described and in combination with a vehicle wheel, of a ring over and adjacent to the hub consisting of elongated peripheral extensions each extension adapted to form a spring element, and chains transversely encircling the tire and rim having their joined ends slidably positioned upon said chain and detachably positioned thereon.

2. A device of the class described and in combination with a vehicle wheel, of a ring suspended in proximity to the center of the wheel having alternate extensions and depressions and having inherent spring elements formed with said ring, transverse radially disposed chains around the tire and rim and joined at their ends for slidably mounting on the ring, and means for detaching one end of the chains from said ring.

In testimony whereof I have hereunto affixed my signature in the presence of two witnesses.

EDWARD F. WHITE.

Witnesses:
 WALTER B. BURROW,
 T. S. JONES.